US011537167B2

(12) United States Patent  
Seol et al.

(10) Patent No.: US 11,537,167 B2  
(45) Date of Patent: Dec. 27, 2022

(54) FLEXIBLE DISPLAY DEVICE

(71) Applicant: LG Display Co., Ltd., Seoul (KR)

(72) Inventors: SeungWon Seol, Paju-si (KR); Hyojin Jung, Seoul (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 17/529,060

(22) Filed: Nov. 17, 2021

(65) Prior Publication Data

US 2022/0179457 A1 Jun. 9, 2022

(30) Foreign Application Priority Data

Dec. 9, 2020 (KR) .................. 10-2020-0171614

(51) Int. Cl.  
*G06F 1/16* (2006.01)  
*G09G 3/00* (2006.01)

(52) U.S. Cl.  
CPC ........... *G06F 1/1652* (2013.01); *G09G 3/035* (2020.08)

(58) Field of Classification Search  
CPC ....... G06F 1/1637; G06F 1/1652; G09G 3/03; G09G 3/035  
USPC .......................................................... 345/55  
See application file for complete search history.

(56) References Cited

U.S. PATENT DOCUMENTS

| 6,328,682 | B1* | 12/2001 | Shudo ................ G03G 15/2057 492/53 |
| 7,819,691 | B2 | 10/2010 | Ryu |
| 9,818,763 | B2 | 11/2017 | Yamazaki |
| 10,199,393 | B2 | 2/2019 | Yamazaki |
| 10,593,703 | B2 | 3/2020 | Yamazaki |
| 10,998,341 | B2 | 5/2021 | Yamazaki |
| 11,095,331 | B2 | 8/2021 | Hwang et al. |
| 11,403,972 | B2 | 8/2022 | Park et al. |
| 2004/0128880 | A1* | 7/2004 | Abe ........................ G09F 11/29 40/514 |

(Continued)

FOREIGN PATENT DOCUMENTS

| CN | 111819615 A | 10/2020 |
| CN | 111833743 A | 10/2020 |

(Continued)

OTHER PUBLICATIONS

Japan Patent Office, Office Action, JP Patent Application No. 2021-195172, dated Nov. 8, 2022, seven pages.

*Primary Examiner* — Amare Mengistu  
*Assistant Examiner* — Gloryvid Figueroa-Gibson  
(74) *Attorney, Agent, or Firm* — Fenwick & West LLP

(57) ABSTRACT

A flexible display device comprises: a module housing including a curved portion configured to be disposed at a connecting portion connecting a horizontal portion and a vertical portion of a main housing, a flat portion configured to be disposed at the horizontal portion and connected to the curved portion, and guide rails disposed at opposite sides of the flat portion and the curved portion, wherein end portions of the guide rails are extended below the curved portion to provide a space under the curved portion; a flexible display panel disposed at a rear surface of the curved portion and partially exposed to the space; a moving plate including a front surface to which the flexible display panel is coupled, wherein the moving plate is moved along the guide rails with the flexible display panel; and a driving member coupled to the module housing and moving the moving plate.

17 Claims, 12 Drawing Sheets

(56) References Cited

U.S. PATENT DOCUMENTS

| | | |
|---|---|---|
| 2006/0125973 A1* | 6/2006 | Akiyama ............... G09F 9/30 349/58 |
| 2007/0019147 A1 | 1/2007 | Ryu |
| 2007/0145203 A1 | 6/2007 | Takada et al. |
| 2015/0014681 A1 | 1/2015 | Yamazaki |
| 2015/0248144 A1 | 9/2015 | Hong et al. |
| 2016/0193924 A1 | 7/2016 | Kim et al. |
| 2016/0265275 A1* | 9/2016 | Rosell Rosell ........... E06B 9/78 |
| 2018/0088695 A1 | 3/2018 | Kim et al. |
| 2018/0122831 A1 | 5/2018 | Yamazaki |
| 2018/0341142 A1 | 11/2018 | Choi et al. |
| 2019/0214410 A1 | 7/2019 | Yamazaki |
| 2020/0212073 A1 | 7/2020 | Yamazaki |
| 2020/0220570 A1 | 7/2020 | Hwang et al. |
| 2020/0365063 A1 | 11/2020 | Park et al. |
| 2021/0044683 A1* | 2/2021 | He ...................... G06F 1/1624 |
| 2021/0225882 A1 | 7/2021 | Yamazaki |
| 2022/0001745 A1 | 1/2022 | Wall |
| 2022/0327970 A1 | 10/2022 | Park et al. |

FOREIGN PATENT DOCUMENTS

| | | |
|---|---|---|
| CN | 111862822 A | 10/2020 |
| CN | 111951675 A | 11/2020 |
| CN | 212010178 U | 11/2020 |
| DE | 102019206935 A1 | 11/2020 |
| JP | 2001-058544 A | 3/2001 |
| JP | 2003-078784 A | 3/2003 |
| JP | 2004-271595 A | 9/2004 |
| JP | 2004-339918 A | 12/2004 |
| JP | 2005-349977 A | 12/2005 |
| JP | 2006-072177 A | 3/2006 |
| JP | 2020-008863 A | 1/2020 |
| KR | 10-2007-0005964 A | 1/2007 |
| KR | 10-2015-0103786 A | 9/2015 |
| KR | 10-2016-0070527 A | 6/2016 |
| KR | 10-1784880 B1 | 10/2017 |
| KR | 10-2017-0134844 A | 12/2017 |
| KR | 10-2019-0092980 A | 8/2019 |
| KR | 10-2020-0085531 A | 7/2020 |

* cited by examiner

FLEXIBLE DISPLAY DEVICE

CROSS REFERENCE TO RELATED APPLICATION

This application claims priority from Korean Patent Application No. 10-2020-0171614, filed on Dec. 9, 2020, which is hereby incorporated by reference for all purposes as if fully set forth herein.

BACKGROUND

Field

Embodiments of the present disclosure relate to a flexible display device.

Description of Related Art

In general, liquid crystal display (LCD) devices, plasma display devices, field emission display devices, and light emitting display devices are under active research as flat panel display devices. Among them, the LCD devices and the light emitting display devices have attracted attention in view of their benefits of mass production, ease of driving means, and high image quality.

Along with studies on technical shortcomings of these flat panel display devices, the necessity of research and development in the structural aspects of flexible display products such as curved and rolling types more appealing to users has been highlighted.

However, such a display device has gradually increased in volume to meet the needs of users for a larger screen, thereby increasing a risk of damage to the display panel and requiring a larger space for installation which makes it difficult for users to secure space.

In addition, in order to provide an always-on-display mode in which various information desired by the users is continuously displayed, an always-on-display device is required in addition to a general display device in a normal display mode, which makes it difficult to satisfy various users' demand.

Therefore, there is a need for research to solve at least one of the aforementioned problems.

BRIEF SUMMARY

Embodiments of the present disclosure provide a flexible display device allowing a user to freely change the display device between an always-on-display mode and a normal display mode.

Embodiments of the present disclosure also provide a flexible display device configured to be mounted without being constrained by additional mounting space, thereby using space efficiently, and to reduce the risk of damage due to an external impact by minimizing the external exposure of the display panel, thereby satisfying various user demands.

The objectives of the embodiments of the present disclosure are not limited to what has been described above, and other unmentioned objectives will be clearly understood to those skilled in the art from the following description.

According to an aspect, embodiments of the present disclosure provide a flexible display device including a module housing including a curved portion configured to be disposed at a connecting portion connecting a horizontal portion and a vertical portion of a main housing, a flat portion configured to be disposed at the horizontal portion and connected to the curved portion, and guide rails disposed at opposite sides of the flat portion and the curved portion, wherein end portions of the guide rails are extended below the curved portion to provide space under the curved portion; a flexible display panel disposed at a rear surface of the curved portion and partially exposed to the space; a moving plate including a front surface to which the flexible display panel is coupled to, wherein the moving plate is configured to be moved along the guide rails with the flexible display panel; and a driving member coupled to the module housing and moving the moving plate.

According to embodiments of the present disclosure, there may be provided a flexible display device allowing a user to freely change the display device between an always-on-display mode and a normal display mode as the flexible display panel moves between a horizontal portion, such as a ceiling or a floor, and a vertical portion, such as a wall along a curved path.

According to embodiments of the present disclosure, there may be provided a flexible display device configured to be mounted without being constrained by additional mounting space, thereby using space efficiently, and to reduce the risk of damage due to an external impact by minimizing the external exposure of the display panel, thereby satisfying various user demands.

DETAILED DESCRIPTION

Figure 1:
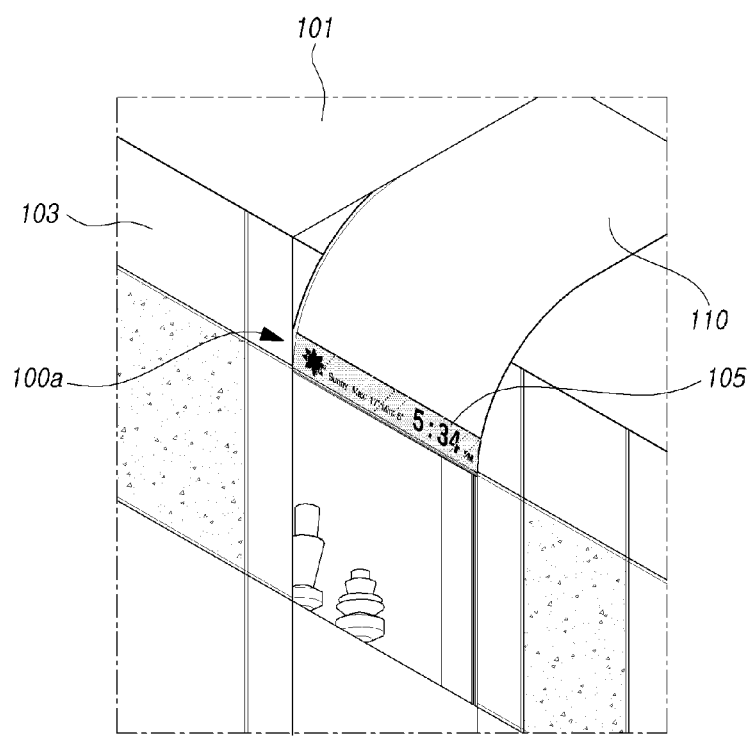
FIGS. 1 and 2 are schematic views illustrating a flexible display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
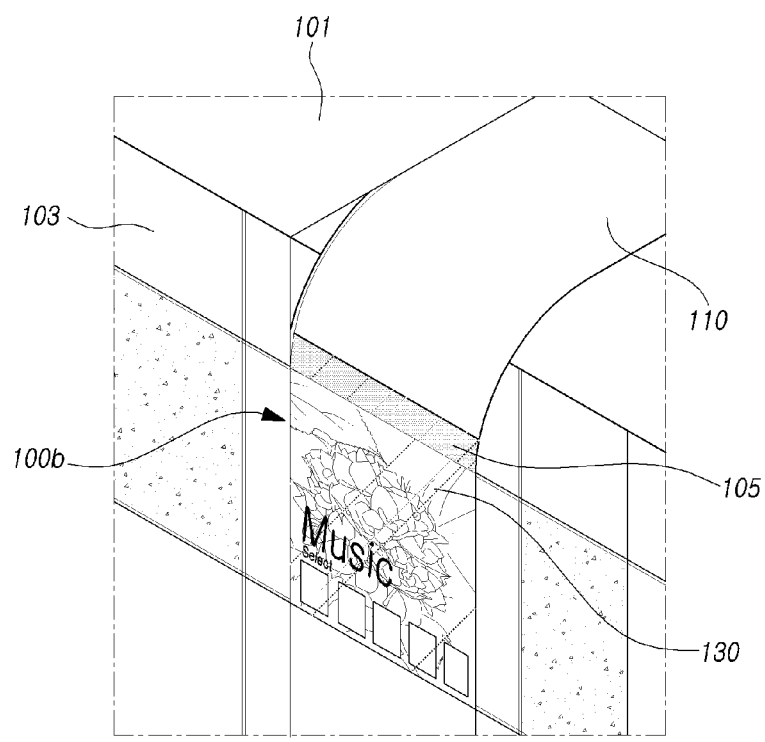
Figure 10:
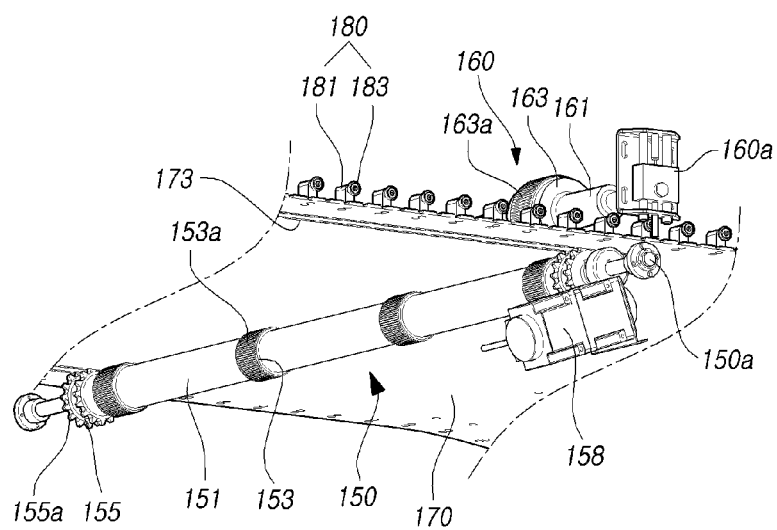
FIGS. 10 to 12 are perspective views illustrating a driving member and surrounding components of a flexible display device according to embodiments of the present disclosure.
Figure 11:
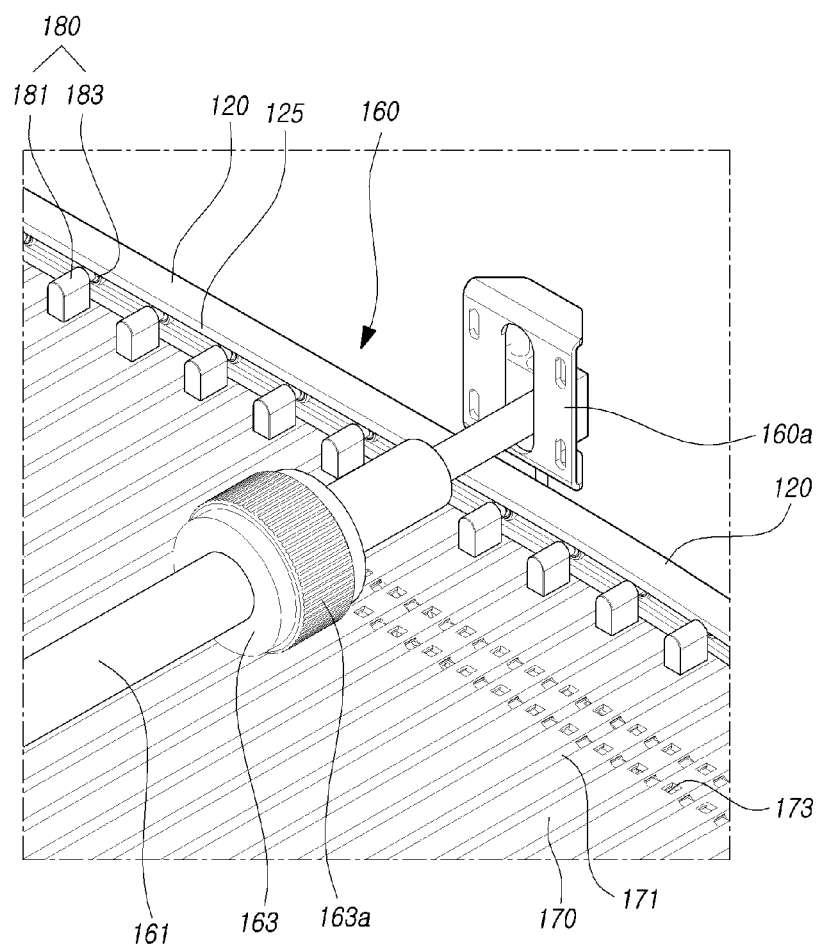
Figure 12:
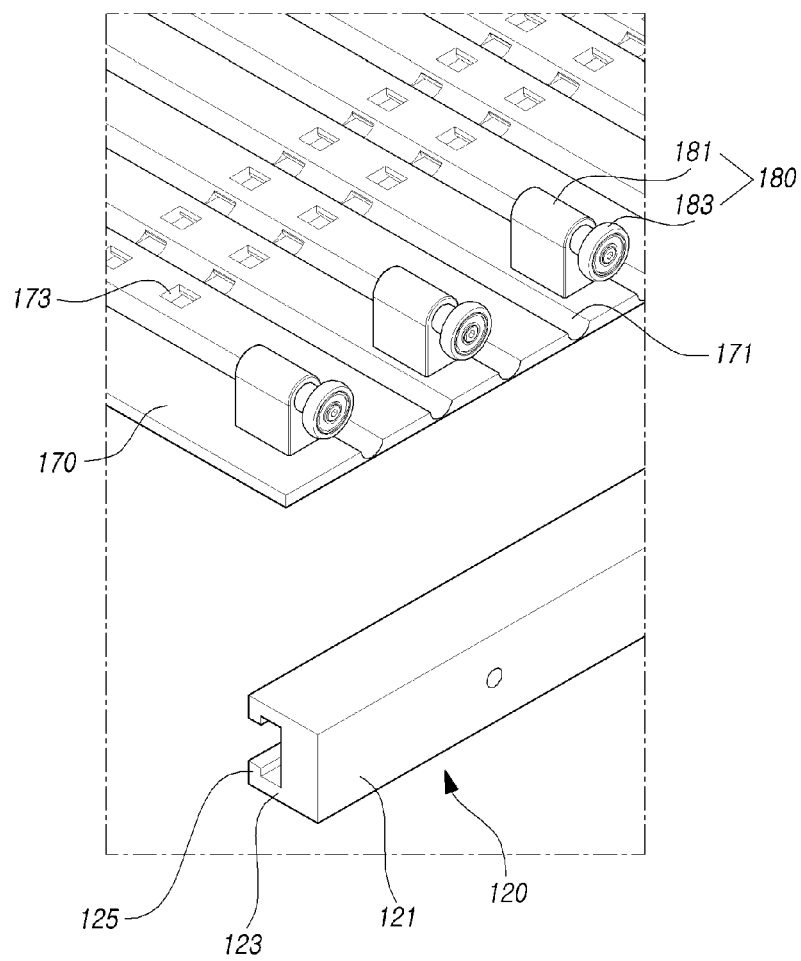

FIGS. 1 and 2 are schematic views illustrating a flexible display device according to embodiments of the present disclosure. FIGS. 3 to 9 are perspective views illustrating a flexible display device according to embodiments of the present disclosure. FIGS. 10 to 12 are perspective views illustrating a driving member and surrounding components of a flexible display device according to embodiments of the present disclosure.

Figure 3:
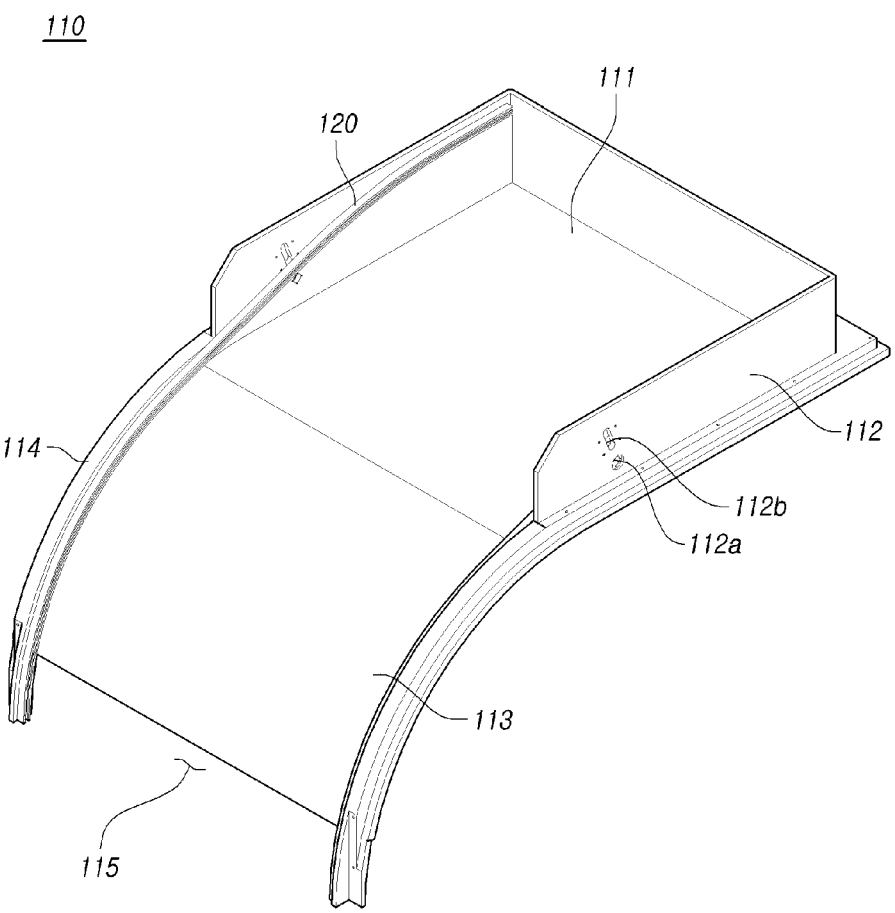
FIGS. 3 to 9 are perspective views illustrating a flexible display device according to embodiments of the present disclosure.
Figure 4:
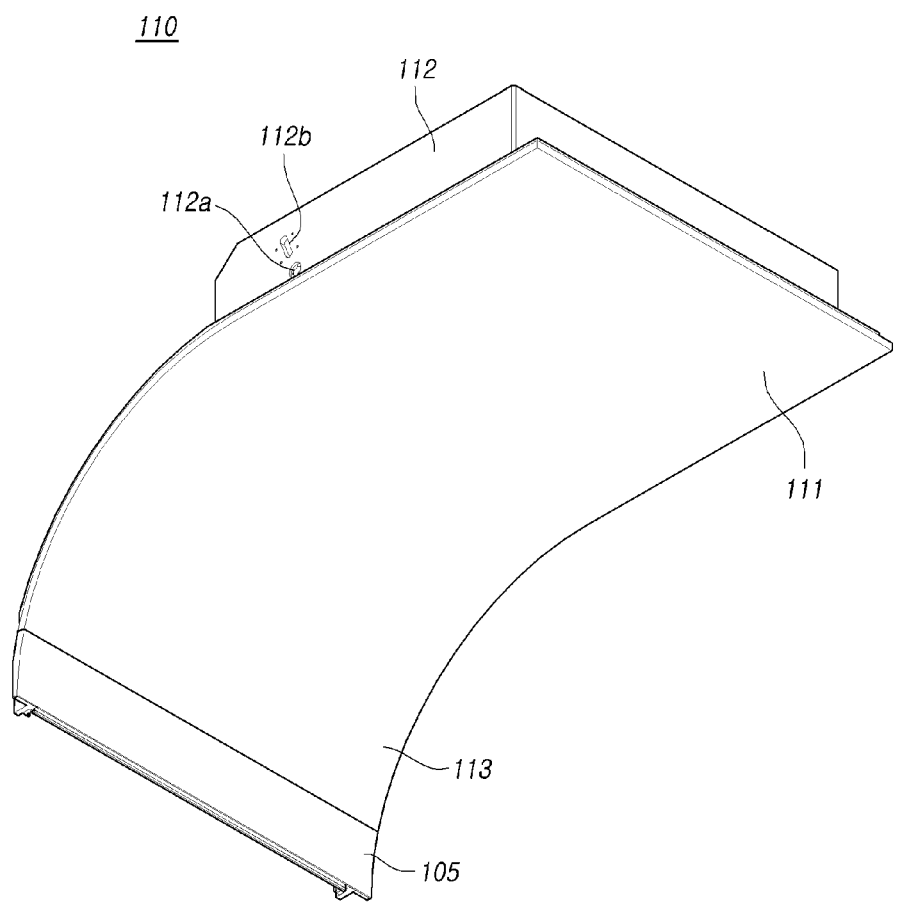
Figure 5:
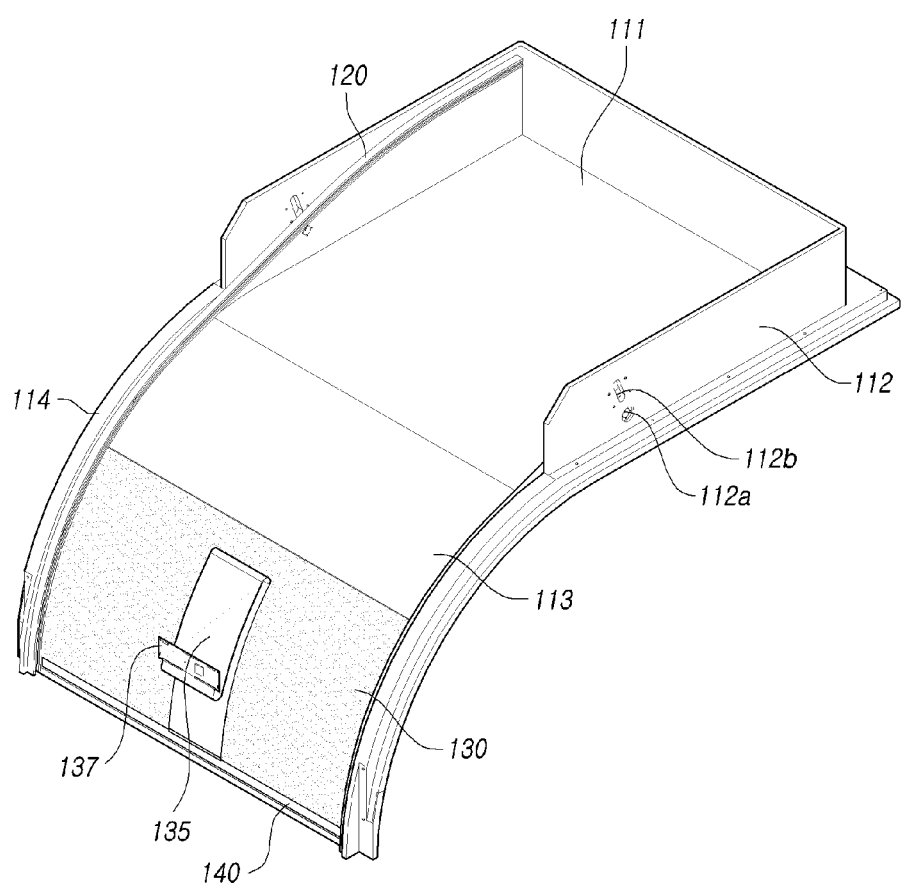
Figure 6:
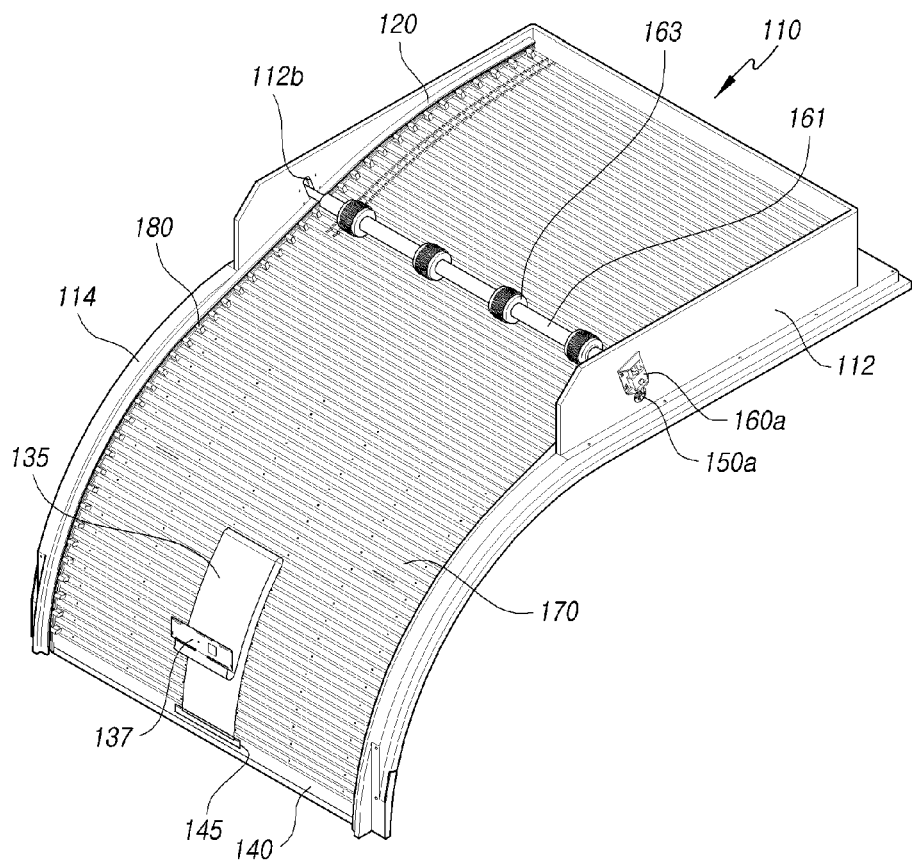

Referring to FIGS. 1 to 2, a flexible display device according to embodiments of the present disclosure is disposed at a connection portion connecting a horizontal portion 101 and a vertical portion 103 of a main housing and operates in an always-on-display mode 100a and a normal display mode 100b, respectively. Referring to FIGS. 3 to 4, the flexible display device may include a module housing 110 including a curved portion 113 disposed at a connecting portion connecting the horizontal portion 101 and the vertical portion 103 of the main housing, a flat portion 111 disposed at the horizontal portion 101 and connected to the curved portion 113, and guide rails 120 disposed at opposite sides of the flat portion 111 and the curved portion 113, wherein the end portions of the guide rails 120 are extended below the curved portion 113 to provide space 115 under the curved portion 113. Referring to FIGS. 5 to 6, the flexible display device may further include a flexible display panel 130 disposed at a rear surface of the curved portion 113 and partially exposed to the space 115, a moving plate 170 including a front surface to which the flexible display panel 130 is coupled, the moving plate 170 moved along the guide rails 120 with the flexible display panel 130, and a driving member coupled to the module housing 110 and moving the moving plate 170, such as a first driving member 150 and a second driving member 160 to be described.

Referring to FIGS. 1 to 2 again, the module housing 110 is fixed to the horizontal portion 101 or the vertical portion 103 of the main housing. The main housing may be an indoor or outdoor part of a building. In the case of an indoor part, the horizontal portion 101 may correspond to a ceiling or floor and the vertical portion 103 may correspond to an inner wall connected thereto. In the case of an outdoor part, the horizontal portion 101 may corresponded to a balcony or a roof and the vertical portion 103 may correspond to an outer wall connected thereto.

Hereinafter, a flexible display device according to embodiments of the present disclosure is given as the horizontal portion 101 corresponds to a ceiling and the vertical portion 103 corresponds to an inner wall connected to the ceiling, based on the most general usage environment which is indoor.

A flexible display device according to embodiments of the present disclosure may provide either of an always-on-display mode (AOD mode), in which information such as a clock, weather or news, is continuously displayed, and a normal display mode in which an image or video intended by a user is displayed.

As illustrated in FIG. 1, in usual time, most of the flexible display panel 130 is covered by the module housing 110 and only a portion of the flexible display panel 130 is overlapped with a transparent cover 105 as the flexible display panel 130 is pulled up, thereby providing the always-on-display mode 100a.

FIG. 1 is illustrated as an empty space is provided at the back side of the vertical portion 103, so that decorations may be provided beneath the transparent cover 105 when the always-on-display mode 100a is being provided.

As illustrated in FIG. 2, when the flexible display panel 130 is pulled down, the flexible display panel 130 comes down under the transparent cover 105, thereby providing the normal display mode 100b while maintaining the full size of the flexible display panel 130.

The flexible display panel 130 may not be stepped with and form the same plane with the vertical portion 103 to achieve a sense of unity.

Referring to FIGS. 3 to 4, the module housing 110 is schematically provided as a connecting shape of the curved portion 113, which is disposed at the connecting portion connecting the horizontal portion 101 and the vertical portion 103, and the flat portion 111, which is disposed at the horizontal portion 101.

The guide rails 120 are provided along the opposite sides of the flat portion 111 and the curved portion 113 of the module housing 110. The curved portion 113 is provided with protruding ends 114 at the opposite sides thereof, so that the guide rails 120 are coupled and supported to the protruding ends 114, respectively. The flat portion 111 is provided with a supporting flange 112 which is embedded in and fixed to the horizontal portion 101. The guide rails 120 are coupled to the supporting flange 120.

In addition, first coupling holes 112a and second coupling holes 112b to which the driving member, to be described, is coupled are provided at opposite sides of the supporting flange 112, respectively. The first coupling holes 112a are disposed opposite to each other and the second coupling holes 112b are disposed opposite to each other.

The space 115 is provided below the curved portion 113, so that the screen of the flexible display panel 130 is being partially viewed from the outside through the transparent cover 105. The protrusion ends 114 at the opposite sides of the curved portion 113 and the guide rails 120 are extended below the curved portion 113 to enable the flexible display panel 130 to be pulled up and down.

Referring to FIG. 4, the transparent cover 105 covering the front surface of the flexible display panel 130 is coupled to a lower end of the curved portion 113 to cover the space 115. The flexible display panel 130 exposed through the space 115 may be viewed while being protected from damage by an external impact when the always-on-display mode is being provided.

The flexible display panel 130 is disposed at the rear surface of the curved portion 113 of the module housing 110 while being bent and overlapped with the space 115. According to embodiments of the present disclosure, the flexible display panel 130 may be either an LCD panel or a light emitting display panel.

That is, when the flexible display panel is an LCD panel, the flexible display panel may further include a backlight unit irradiating light onto the LCD panel, a lower polarization plate attached to a lower substrate, and an upper polarization plate attached to a front surface of an upper substrate. The specific configurations of the lower substrate and the upper substrate may vary according to driving modes of the LCD panel, for example, twisted nematic (TN) mode, vertical alignment (VA) mode, in plane switching (IPS) mode, and fringe field switching (FFS) mode.

Further, when the flexible display panel is a light emitting display panel, the light emitting display panel may include a lower substrate with a plurality of light emitting cells formed in the areas each of which is defined by gate lines, data lines, and power (VDD) lines, and an upper substrate bonded to the lower substrate face to face. Drawings and a detailed description of the light emitting display panel are not provided herein.

As described above, the flexible display panel is not limited to any particular type in embodiments of the present disclosure. For example, the flexible display panel may be made up of a flexible substrate to be bendable in embodiments of the present disclosure. The following description is given irrespective of display panel types.

Figure 7:
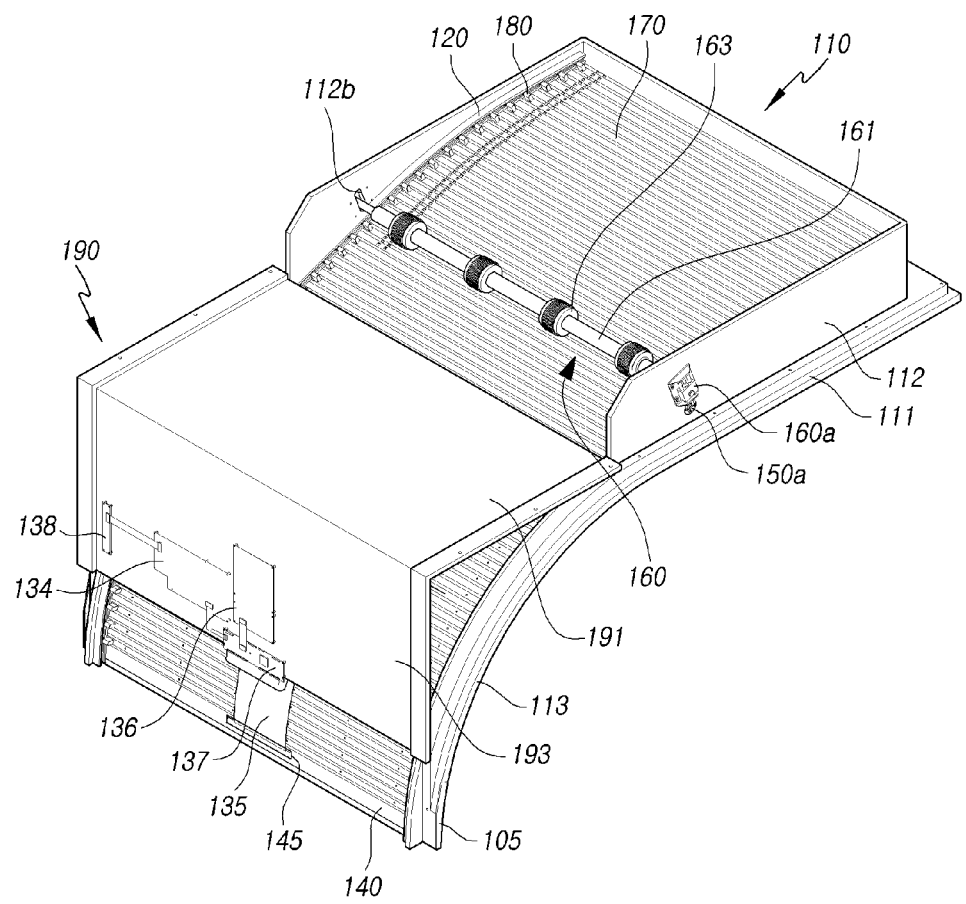

Referring to FIGS. 6 to 7, the flexible display panel 130 is coupled to the front surface of the moving plate 170, and a plurality of grooves 171 are provided on the rear surface of the moving plate 170 between the opposite sides thereof. Thus, the moving plate 170 is also being bent with a flat plane and a curved plane while being moved along the guide rails 120 with the flexible display panel 130.

The moving plate 170 is provided with a through hole 145 penetrated by a flexible circuit film 135 connected to a source printed circuit board 140 of the flexible display panel 130. Thus, the flexible display panel 130 and the moving plate 170 may be stably moved while the flexible circuit film 135 is connected to a control printed circuit board 137.

Referring to FIG. 7, the control printed circuit board 137 to which the flexible circuit film 135 is connected is fixed to an inner housing 190 disposed behind the curved portion 113 and coupled to the main housing to which the module housing 110 is fixed. Thus, the control printed circuit board 137 to which a main board 134 and a power board 136, to be described, are connected may be stably fixed while the moving plate 170 and the flexible display panel 130 are being moved.

The inner housing 190 includes a first fixed portion 191 parallel to the flat portion 111 and coupled to the main housing, and a second fixed portion 193 connected to the first fixed portion 191 with a constant angle and to which the control printed circuit board 137 is fixed.

The main board 134, which an image processor electrically connected to the control printed circuit board 137 and supplying a data signal and a control signal is mounted on, and the power board 136, which supplies power to the flexible display panel 130, are fixed to the second fixed portion 193.

In addition, a position sensor 138 coupled to the inner housing 190 senses and transmits the position of the flexible display panel 130 to the main board 134. The main board 134 controls the flexible display panel 130 to operate in the always-on-display mode or the normal display mode according to the position of the flexible display panel 130.

The position of the flexible display panel 130 which determines the flexible display panel 130 to operate in the always-on-display mode may be set in advance. As illustrated in FIG. 1, embodiments of the present disclosure may be provided with the main board 134 controlling the flexible display panel 130 to operate in the always-on-display mode when the lower end portion of the flexible display panel 130 is positioned at the lower end portion of the transparent cover 105 while being overlapped with the transparent cover 105. Further, the main board 134 controls the flexible display panel 130 to operate in a normal display mode when an upper end portion of the flexible display panel 130 is positioned at the lower end portion of the transparent cover 105.

Figure 8:
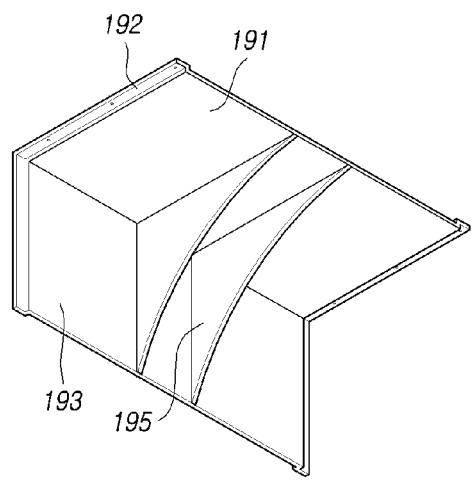

Referring to FIG. 8, the inner housing 190 further includes a third fixed portion 195 connected to the first fixed portion 191 and the second fixed portion 193. The inner end portion of the third fixed portion 195 is provided with a curved surface spaced apart from the moving plate 170. Thus, the flexible display panel 130 is protected from damage by being supported by the third fixed portion 195 even if the moving plate 170 is separated from the guide rails 120.

Referring to FIGS. 10 and 11, the driving member coupled to the module housing 110 and moving the moving plate 170 includes a first driving member 150 moving the moving plate 170 while supporting the front surface of the moving plate 170, and a second driving member 160 supporting the rear surface of the moving plate 170.

The first driving member 150 includes first rollers 153 supporting the front surface of the moving plate 170, a first shaft 151 having opposite ends rotatably coupled to the module housing 110 to rotate the first rollers 153, and a driving motor 158 rotating the first shaft 151. The first shaft 151 is inserted into the first coupling holes 112a at the opposite sides of the supporting flange 112 of the flat portion 111 and is rotatably coupled by a first coupling member 150a.

The second driving member 160 includes second rollers 163 supporting the rear surface of the moving plate 170, a second shaft 161 having opposite ends rotatably coupled to the module housing 110 to rotate the second rollers 163. The second shaft 161 is inserted into the second coupling holes 112b at the opposite sides of the supporting flange 112 of the flat portion 111 and is rotatable coupled to a second coupling member 160a.

The first driving member 150 and the second driving member 160 are disposed opposite to each other with the moving plate 170 interposed therebetween to support the front and rear surfaces of the moving plate 170 at the same position, thereby stably supporting the moving of the moving plate 170.

The moving plate 170 is provided with holes 173 penetrating the front and rear surfaces at the position spaced apart from the opposite sides thereof. The first driving member 150 includes rotation supporting members 155 having protrusions 155a configured to be inserted into the holes 173.

Therefore, the moving plate 170 supported by the protrusions 155a moves along the guide rails 120 as the rotation supporting member 155 is rotated by the driving motor 158, and the accurate movement may be executed even if the first rollers 153 and the second rollers 163 slip.

In addition, the first rollers 153 and the second rollers 163 are respectively provided with a damping member 153a, 163a formed with urethane or silicone on the outer circumferential surface, thereby preventing a deformation and a slip and minimizing noise when the moving plate 170 moves.

Referring to FIG. 12, rolling members 180 which roll along the guide rail 120 are provided at the opposite ends of the rear surface of the moving plate 170. Each of the rolling members 180 includes a guide roller 183 which rolls while being supported by the guide rails 120, and a roller fixing member 181 to which a guide roller 183 is rotatably coupled and coupled to the rear surface of the moving plate 170.

The guide rail 120 includes a coupling portion 121 coupled to the module housing 110, extended portions 123 extended toward the moving plate 170 at opposite sides of the coupling portion 121 so that the guide rollers 183 are inserted into and supported by, and bent end portions 125 bent toward each other at the ends of the extended portions 123 to prevent separation of the guide rollers 183 from the guide rails 120, respectively.

Therefore, the moving plate 170 moves as the guide rollers 183 roll and supported by the extended portions 123 of the guide rails 120. The separation of the guide rollers 183 is prevented as the side surface of the guide rollers 183 is supported by the bent end portions 125.

Figure 9:
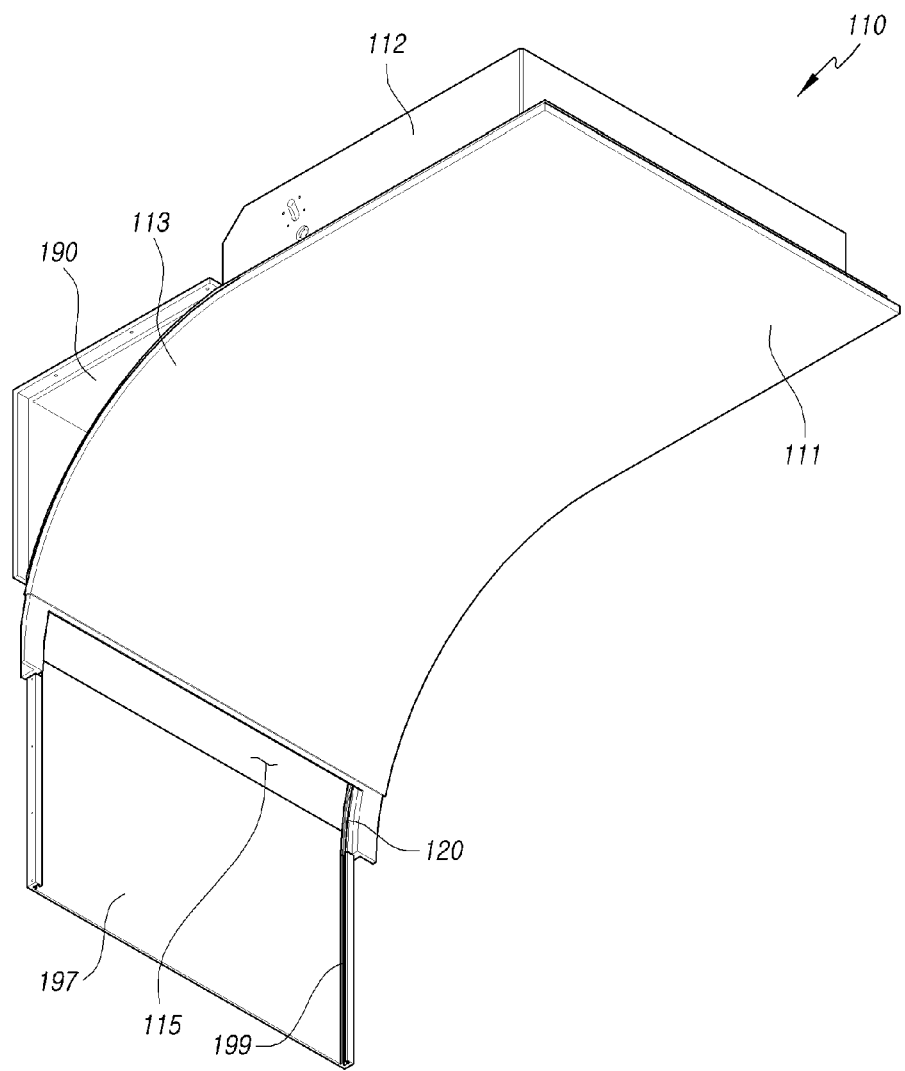

Referring to FIG. 9, the flexible display device according to embodiments of the present disclosure may further include a lower housing 197 coupled to the lower end of the curved portion 113 of the module housing 110. The lower housing 197 includes connecting rails 199 at the opposite sides thereof, the connecting rails 199 are connected with the guide rails 120 and the guide rollers 183 may move along the guide rails 120 and the connecting rails 199 as the moving plate 170 moves.

The lower housing 197 is fixed to the vertical portion 103 while supporting the opposite sides of the flexible display panel 130 and the moving plate 170, so that the flexible display panel 130 and the moving plate 170 may maintain a flat shape without being separated from each other in the maximum down state.

The lower housing 197 is provided with a flat shape. The lower housing 197 is provided with the connecting rails 199 connected to the guide rails 120 at the opposite sides thereof and is coupled to the protruding ends 114 at the lower portion of the curved portion 113. In some cases, the connecting rails 199 may be separately coupled to the opposite sides of the inside of the main housing.

As described above, according to embodiments of the present disclosure, a flexible display device allows a user to freely change the display device between an always-on-display mode and a normal display mode as the flexible display panel moves between a horizontal portion, such as a ceiling or a floor, and a vertical portion, such as a wall.

Further, according to embodiments of the present disclosure, a flexible display device is configured to be mounted without being constrained by additional mounting space, thereby using space efficiently, and to reduce the risk of damage due to external impact by minimizing the external exposure of the display panel, thereby satisfying various user demands.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A flexible display device comprising:
    a module housing including a curved portion disposed at a connecting portion connecting a horizontal portion and a vertical portion of a main housing, a flat portion disposed at the horizontal portion and connected to the curved portion, and guide rails disposed at opposite sides of the flat portion and the curved portion, wherein end portions of the guide rails are extended below the curved portion to provide space under the curved portion;
    a flexible display panel disposed at a rear surface of the curved portion and partially exposed to the space;
    a moving plate including a front surface to which the flexible display panel is coupled, wherein the moving plate is configured to be moved along the guide rails with the flexible display panel; and
    a driving member coupled to the module housing and moving the moving plate,
    wherein the moving plate is provided with a through hole penetrated by a flexible circuit film connected to a source printed circuit board of the flexible display panel.

2. The flexible display device according to claim 1, further comprising:
    an inner housing disposed behind the curved portion and coupled to the main housing to which the module housing is fixed, wherein the flexible circuit film and a control printed circuit board connected to the flexible circuit film are fixed to the inner housing.

3. The flexible display device according to claim 2, wherein the inner housing includes a first fixed portion parallel to the flat portion and coupled to the main housing, and a second fixed portion connected to the first fixed portion with a constant angle and to which the control printed circuit board is fixed.

4. The flexible display device according to claim 3, wherein a main board and a power board are fixed to the second fixed portion, an image processor electrically connected to the control printed circuit board and supplying a data signal and a control signal is mounted on the main board, and the power board supplies power to the flexible display panel.

5. The flexible display device according to claim 4, wherein a transparent cover covering the front surface of the flexible display panel is coupled to the curved portion to cover the space to provide an always-on-display mode of the flexible display panel.

6. The flexible display device according to claim 5, wherein a position sensor coupled to the inner housing senses and transmits a position of the flexible display panel to the main board, and the main board controls the flexible display panel to operate in the always-on-display mode when a lower end portion of the flexible display panel is positioned at a lower end portion of the transparent cover.

7. The flexible display device according to claim 6, wherein the main board controls the flexible display panel to operate in a normal display mode when an upper end portion of the flexible display panel is positioned at the lower end portion of the transparent cover.

8. The flexible display device according to claim 3, wherein the inner housing further includes a third fixed portion connected to the first fixed portion and the second fixed portion, and an inner end portion of the third fixed portion is provided with a curved surface spaced apart from the moving plate.

9. The flexible display device according to claim 1, wherein the driving member comprises:
   a first driving member including first rollers supporting the front surface of the moving plate, a first shaft having opposite ends rotatably coupled to the module housing to rotate the first rollers, and a driving motor rotating the first shaft; and
   a second driving member including second rollers supporting a rear surface of the moving plate, a second shaft having opposite ends rotatably coupled to the module housing to rotate the second rollers.

10. The flexible display device according to claim 9, wherein the moving plate is provided with holes penetrating the front and rear surfaces at the opposite sides thereof, and the first driving member includes rotation supporting members having protrusions configured to be inserted into the holes.

11. The flexible display device according to claim 9, wherein the first rollers and the second rollers are provided with damping members formed with urethane or silicone on outer circumferential surfaces thereof, respectively.

12. The flexible display device according to claim 1, wherein rolling members which roll along the guide rails are provided on opposite sides of the rear surface of the moving plate.

13. The flexible display device according to claim 12, wherein each of the rolling members includes a guide roller which rolls while being supported by the guide rail and a roller fixing member to which the guide roller rolling along the guide rail is coupled and provided on the rear surface of the moving plate.

14. The flexible display device according to claim 13, wherein the guide rail includes a coupling portion coupled to the module housing, extended portions extended toward the moving plate at opposite sides of the coupling portion so that the guide rollers are inserted into and supported by the extended portions, and bent end portions bent toward each other at ends of the extended portions to prevent separation of the guide rollers from the guide rail, respectively.

15. The flexible display device according to claim 13, wherein the flexible display device further comprises:
   a lower housing coupled to the lower end of the curved portion and including connecting rails at opposite sides thereof, wherein the connecting rails are connected with the guide rails so that the guide rollers roll and move therein.

16. The flexible display device according to claim 1, wherein the moving plate includes a rear surface having grooves at the opposite sides thereof.

17. The flexible display device according to claim 1, wherein the flat portion is provided with a supporting flange which is embedded in and fixed to the horizontal portion, and the guide rails are coupled to the supporting flange.

* * * * *